United States Patent [19]

Sakuma et al.

[11] E Patent Number: Re. 31,797

[45] Reissued Date of Patent: Jan. 8, 1985

[54] ARC-SHIELD SUPPORTING STRUCTURE OF A VACUUM POWER INTERRUPTER

[75] Inventors: Shinzo Sakuma, Yokohama; Junichi Warabi, Shizuoka, both of Japan

[73] Assignees: Kabushiki Kaisha Meidensha; Kabushiki Kaisha Gemvac, both of Tokyo, Japan

[21] Appl. No.: 378,825

[22] Filed: May 17, 1982

Related U.S. Patent Documents

Reissue of:

[64] Patent No.: 4,310,735
Issued: Jan. 12, 1982
Appl. No.: 49,456
Filed: Jun. 18, 1979

[30] Foreign Application Priority Data

Jun. 23, 1978 [JP] Japan ..... 53-86127

[51] Int. Cl.[3] ..... H01H 33/66

[52] U.S. Cl. ..... 200/144 B

[58] Field of Search ..... 200/144 B

[56] References Cited

U.S. PATENT DOCUMENTS 3,048,681 8/1962 Polinko, Jr. ..... 200/144 B
4,158,911 6/1979 Polinko, Jr. ..... 200/144 B

FOREIGN PATENT DOCUMENTS 1093231 11/1967 United Kingdom ..... 200/144 B

*Primary Examiner*—Robert S. Macon
*Attorney, Agent, or Firm*—McAulay, Fields, Fisher, Goldstein & Nissen

[57] ABSTRACT

An arc-shield supporting structure of a vacuum power interrupter is disclosed which comprises a hollow cylindrical supporting means having a turnover end portion embedded in the inner wall of the insulating envelope, and a connecting means one end of which is fitted over the supporting means while the other end of which is fixed to the arc-shield member.

7 Claims, 8 Drawing Figures

ARC-SHIELD SUPPORTING STRUCTURE OF A VACUUM POWER INTERRUPTER

Matter enclosed in heavy brackets [ ] appears in the original patent but forms no part of this reissue specification; matter printed in italics indicates the additions made by reissue.

BACKGROUND OF THE INVENTION

The present invention relates to a vacuum power interrupter, and more particularly to an arc-shield supporting structure of a vacuum power interrupter.

In an vacuum power interrupter, an arc is produced between electrical contacts at the time when the contacts are closed and thereby an electric current flows or at the time when the contacts are opened and thereby the electric current flow is interrupted, whereby metal particles from the electrical contact are scattered.

In order to shield such scattering metal particles a vacuum power interrupter is provided with a metal shield member so as to surround the electrical contacts. This makes it possible to freeze and solidify them onto the surface of the shield member, thereby to prevent a deterioration of insulation at the inner wall of the insulating vessel. Since the shield member is required to make an electric potential level within an interrupter uniform and maintain good insulation, it is necessary to dispose the shield member symmetrically with respect to stationary and movable electric contacts and support it on the inner surface of the vacuum vessel so that its electric potential becomes floating level. Moreover, since a large impact force is applied to the shield member when interrupting an electric current, it is necessary to constitute the shield member so that it can effectively relax this impact force and has durable construction while being free from play or swing.

Reference is made to prior art arc-shield supporting structure of a vacuum power interrupter. A method of making the supporting structure comprises the steps of stacking two small size containers each having a tubular flange formed at the axial ends of two small containers stacked, interposing the shield member therebetween, and joining them by means of brazing to form a vacuum vessel.

Since it is necessary to use a metal fitting for supporting the shield member, a creeping distance for maintaining insulation is substantially reduced. As a result, it is necessary to elongate the insulating tube so as to guarantee the creeping distance, resulting in enlarging the size of the vacuum power interrupter. In the prior art vacuum power interrupter fabricated by stacking two vacuum containers, the number of connecting portions increases. Further, in the above construction the shield member is supported at the connecting portion, resulting in an increase of the number of connecting plates and welding step, and a requirement of high skill in welding technique. Another drawback is that the number of assembly steps are increased, resulting in low work efficiency.

SUMMARY OF THE INVENTION

With the above in mind, an object of the present invention is to provide a vacuum power interrupter with a durable arc-shield supporting structure.

Another object of the present invention is to provide an arc-shield supporting structure of a vacuum power interrupter capable of effectively preventing a deterioration of insulation within a vacuum vessel.

A further object of the present invention is to provide a vacuum power interrupter which makes it possible to reduce the size and fabricating steps thereof.

In one embodiment of the present invention, there is provided an arc-shield supporting structure of a vacuum power interrupter comprising a hollow cylindrical supporting means which is integrally formed with a turnover end portion embedded in the inner wall of the insulating envelope so that its axis is directed in the radial direction of an insulating envelope, and a connecting means one end of which is fitted over the supporting means while the other end of which is fixed to a shield member.

BRIEF DESCRIPTION OF THE DRAWINGS

The features and advantages of an arc-shield supporting structure of a vacuum power interrupter according to the present invention will become more apparent from the following description taken in conjunction with the accompanying drawings, in which.

In these drawings, the same numerals indicate the same or similar elements of the arc-shield supporting structure of a vacuum power interrupter of the present invention.

DETAILED DESCRIPTION OF THE PREFERRED EMBODIMENTS

Figure 1:
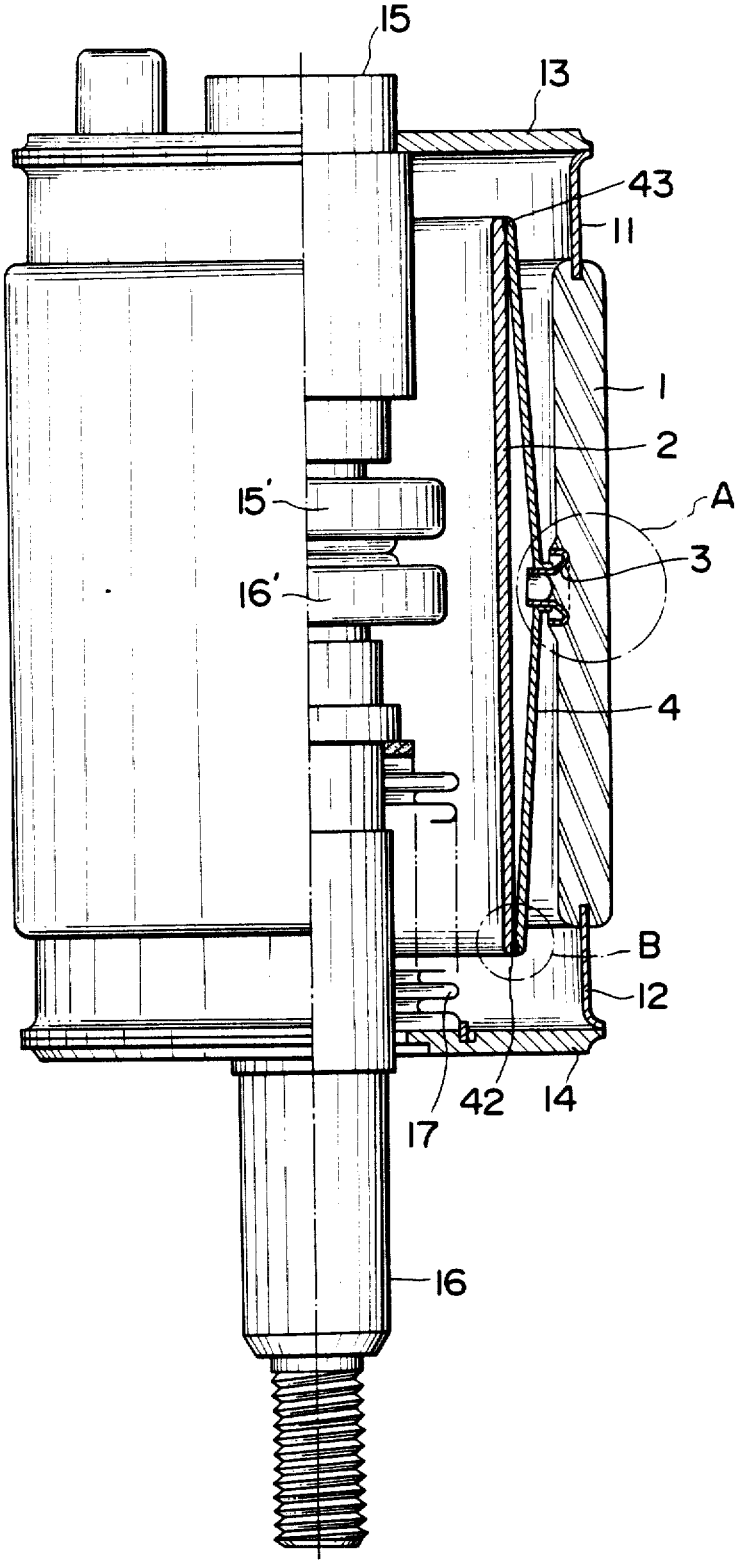
FIG. 1 is a front view, partially in cross section, illustrating an arc-shield construction of a vacuum power interrupter according to the present invention.

Referring to FIGS. 1 to 4, an embodiment of the present invention will be described. As shown in FIG. 1, a vacuum power interrupter comprises an insulating cylindrical envelope 1 of glass, a pair of end plates 13, 14 hermetically fastened to the respective axial ends of the insulating envelope 1 through tubular flanges 11, 12 which are embedded on the both ends of the insulating envelope 1. The vacuum power interrupter further comprises stationary and movable contact rods 15, 16 hermetically provided through the end plates 13, 14, respectively, in such a manner that they are aligned to each other in the axial direction of the insulating envelope. More particularly, the movable contact rod 16 is at the upper end thereof fastened to the upper end of a bellows 17 the lower end of which is mounted on the end plate 14, so that the movable contact rod 16 is movable upwardly and downwardly with respect to the stationary contact rod 15 to move into contact with and out of contact from it. Reference numerals 15', 16' denote electrical contacts attached on the lower and upper ends of the contact rods 15, 16, respectively.

Figure 2:
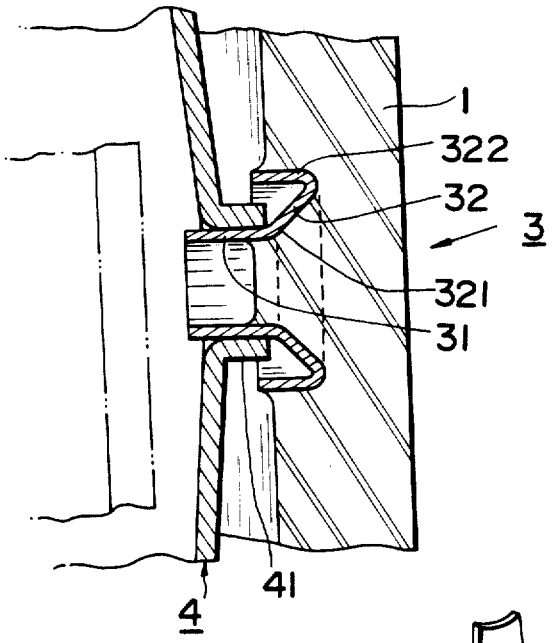
FIG. 2 is a cross sectional front view illustrating a detail of a part labelled by symbol A in FIG. 1.
Figure 3:
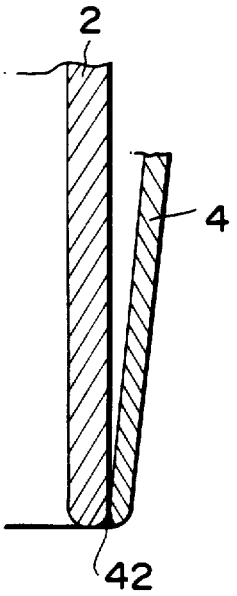
FIG. 3 is a cross sectional front view illustrating a detail of a part labelled by symbol B in FIG. 1.
Figure 4:
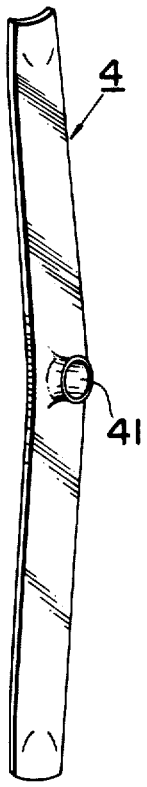
FIG. 4 is a perspective view illustrating a connecting means employed in an embodiment according to the present invention.

Reference numeral 2 denotes a tubular metal arc-shield member disposed between the stationary and movable contact rods 15, 16 and the insulating envelope 1 under a floating potential difference condition so as to surround the electrical contacts 15', 16'. Reference numeral 3 denotes a supporting metal fitting formed as a hollow cylindrical member with an axially symmetrical cavity therein, as for example, tubular member. This supporting metal fitting, as shown in FIG. 2, comprises a supporting portion 31 and a turnover end portion 32 wherein the turnover end portion 32 comprises cone-shaped portion 321 which is integral with the one end of the supporting portion 31 having a radius which is gradually enlarged toward outwards, and a bent portion 322 which is formed by bending the one end of the cone-shaped portion 321 outwardly. With this construction, the contacting surface between the turnover end portion 32 and the insulating envelope 1 of glass increases to guarantee the reliability in fastening between the supporting metal fitting 3 and the insulating envelope 1. A predetermined number (for example, three) of the supporting metal [fi-tings] *fittings* 3 are disposed so that the central axis of each is directed to the radial direction, and the turnover end portion 32 is fitted within the wall of the insulating envelope 1 while the supporting portion 31 projects inwardly through the surface of the wall of the insulating envelope 1. The supporting metal fitting 3 is made of a material having the same coefficient of thermal expansion as the insulating envelope 1. Reference numeral 4 denotes a connecting metal fitting wherein it is formed as an elongated plate, as shown in FIG. 4 and is bent at the middle portion thereof in the direction of thickness so as to become dogleg shaped in appearance. Moreover, the connecting metal fitting 4 has both ends positioned in the longitudinal direction, each of which is curved so as to adapt the exterior surface of the arc-shield member 2. The connecting metal fitting 4 is provided at the outside (corresponding to the opposite side with respect to the bending direction) with a mounting portion 41 projected outwardly in which a hole having an inclined surface is provided. The connecting metal fitting 4 is, as shown in FIGS. 1 and 3, disposed at the outside of the arc-shield member 2 in the same direction as that of the axial direction of the arc-shield member 2. The both ends of the connecting metal fitting 4 becomes in contact with the arc-shield member 2 to fix at the fixing portions 42 and 43 to the arc-shield member 2 by means of brazing or welding (arc or resistance welding).

As stated above, the connecting metal fitting 4 is formed as a dogleg shape wherein the both ends in the longitudinal direction are positioned to the axial ends of the arc-shield member 2 and are fastened to it. Accordingly, solely fixing portions 42 and 43 of the connecting metal fitting 4 is in contact with the arc-shield member 2 while the remaining portion except for the fixing portions 42 and 43 is away from the exterior surface of the arc-shield member 2. The connecting metal fitting 4 fixed to the outside of the arc-shield member 2, as shown in FIGS. 1 and 3, joins the arc-shield member 2 with the supporting means 3 by fitting the supporting portion 31 of the supporting metal fitting 3 embedded in the insulating envelope 1 of glass into the hole of the mounting portion 41 provided on the connecting metal fitting 4. Reference is now made to the connecting metal fitting 3, which is provided outside the arc-shield member 2 so that the number thereof is the same as that of a plurality of connecting metal fittings 4 embedded in the insulating envelope 1. The connecting metal fitting 4 is made of the same material and coefficient of thermal expansion as that of the metal shield member 2.

Reference is now made to a method of assembling a vacuum power interrupter.

Figure 5:
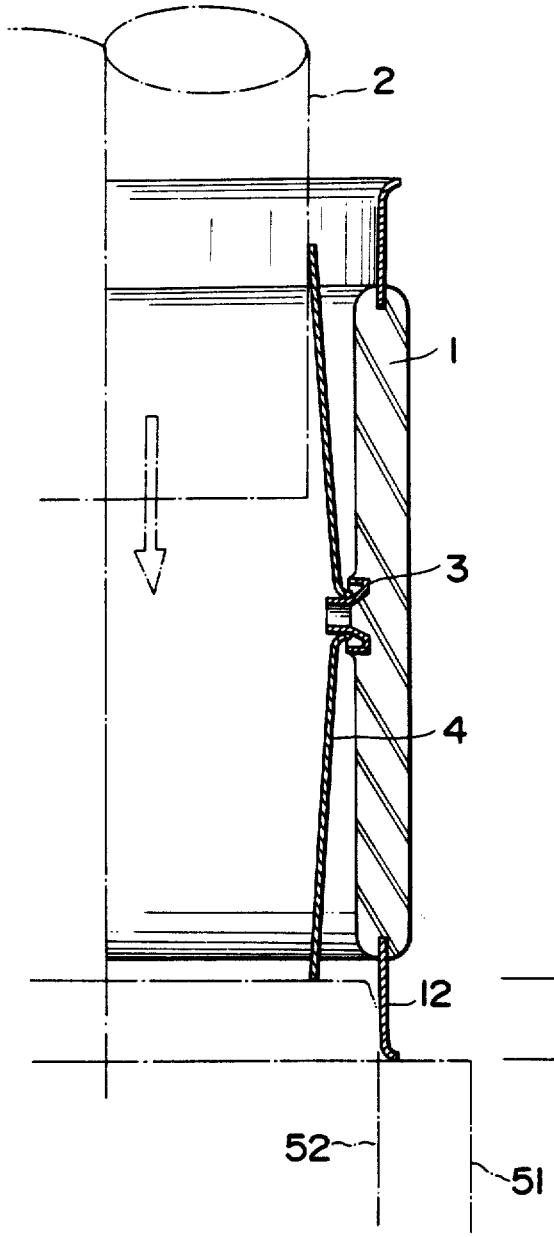
FIGS. 5 and 6 are respectively cross sectional front views showing a work for assembling an arc-shield member within an insulating envelope employed in the present invention.
Figure 6:
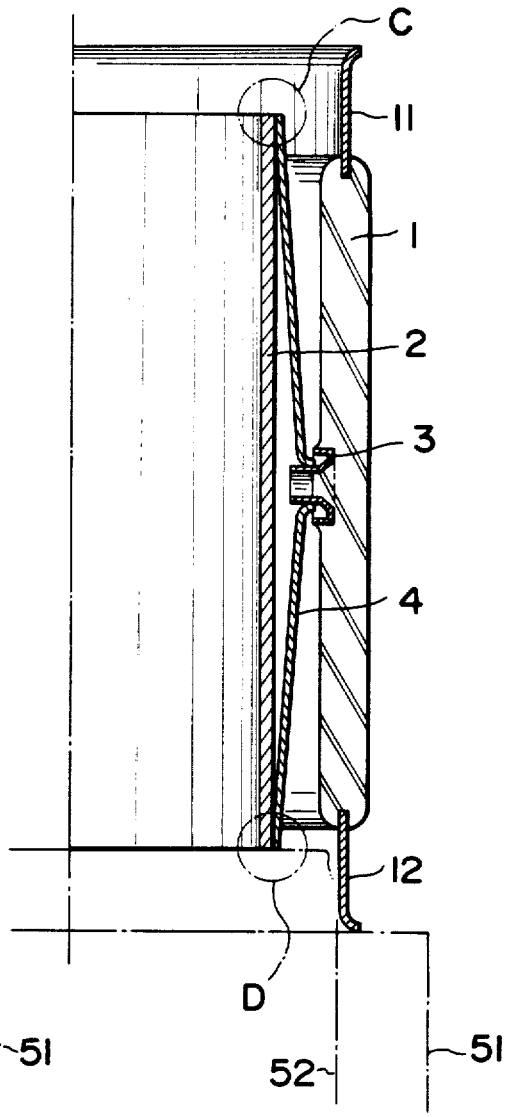

First, a method of joining the glass insulating envelope 1 with the arc-shield member 2 previously explained from the foregoing in FIGS. 1 to 4 will be explained with reference to FIGS. 5 and 6. In FIGS. 5 and 6, corresponding reference numerals used in FIGS. 1–4 show similar or equivalent parts and therefore its explanation will be omitted.

A method of embedding supporting metal fitting 3 into insulating envelope 1 comprises the steps of heating supporting metal fitting 3 by means of induction heating, pressing supporting metal fitting 3 onto the inner surface of insulating envelope 1 which was preheated at a predetermined temperature thereby to melt glass material as a constituent of insulating envelope 1, and inserting turnover end portion 32 of the supporting metal fitting 3 in glass insulating envelope 1 to fix it. Since supporting metal fitting 3 is formed as a tubular cavity, melted glass is immersed into the cavity whereby supporting metal fitting 3 is securely fixed. Then, insulating envelope 1 is mounted on the base 51 and fixedly supported by a clamp device 52. Next, connecting metal fitting 4 is inserted within insulating envelope 1 and then supporting metal fitting 3 provided on the inner wall of insulating envelope 1 is fitted into the hole of mounting portion 41 of connecting metal fitting 4. Thus, this connecting metal fitting 4, as shown in FIG. 5, is mounted to insulating envelope 1.

Arc-shield member 2 is inserted from upwards to downwards within insulating envelope 1 and is mounted on clamp device 52. Thus, the both ends (upper and lower ends C, D shown in FIG. 6) in the longitudinal direction of each connecting metal fitting 4 are brought into contact with the outside of arc-shield member 2 and are connected thereto. The portions C, D in FIG. 6, which corresponds to the connecting portions between arc-shield member 2 and connecting metal fitting 4, are fixed to each other by means of a welding, so that both members will be joined. Reference is made to the detail of this method.

Connecting portion C is firstly fixed to arc-shield member 2 and then, insulating envelope 1 and arc-shield member 2 are separated from base 51 and clamp device 52. These components are turned upsidedown and mounted on base 51 and clamp device 52. Thereafter, connecting portion D is fixed. Thus, the connection between insulating envelope 1 and arc-shield member 2 has been completed. Reference is finally made to a method of assembling the end plates to insulating envelope. The method comprises the steps of disposing the stationary end plate 13 to which stationary contact rod 15 is joined and movable end plate 14 to which movable contact rod 16 and bellows 17 are joined, respectively, at the ends of the tubular [franges] *flanges* 11 and 12 provided on the axial ends of insulating envelope 1 in which arc-shield member 2 is assembled, and combining end plates with insulating envelope by means of a welding to form a vacuum power interrupter.

From the foregoing, the arc-shield supporting structure of a vacuum power interrupter according to the present invention will provide the following advantages:

Since supporting metal fitting 3 embedded in the radial direction in the inner wall of the glass insulating envelope 1 is formed as an axially symmetrical cavity member, melted glass material can be inserted into the cavity whereby connecting surface between glass material constituting insulating envelope 1 and supporting metal fitting 3 is enlarged to make it possible to securely fasten supporting metal fitting 3 to insulating envelope 1.

Moreover, it is easy to form projecting mounting portion 41 provided on the inner wall of insulating envelope 1 by heating supporting metal fitting 3, pressing it to the inner surface of insulating envelope 1, and embedding it therein. Supporting metal fitting 3 is provided at turnover end portion 32 with the cone-shaped portion 321, thereby to enable to enlarge the connecting surface in contact with the glass material. As a result, it is possible to securely fix supporting metal fitting 3. Moreover, it is possible to stop the movement of shield member 2 and connecting metal fitting 4 in the radial direction thereof (corresponding to axial direction with respect to supporting metal fitting 3) by the cone-shaped portion 321, thereby to limit it suitably. As a result, damage to the insulating envelope can be prevented, even if an unexpected force is applied to the envelope, for example, during fabricating.

The connection between insulating envelope 1 and shield member 2 can be easily carried out only by fitting supporting metal fitting 3 provided in the insulating envelope 1 into mounting portion 41 of connecting metal fitting 3. Since mounting portion 41 has a predetermined thickness between its diameter and that of hole, the connection between connecting metal fitting 4 and supporting metal fitting 3 can be securely maintained thereby to make it possible to securely fix metal shield member 2. Further, since mounting portion 41 of connecting metal fitting 4 is provided with a tapered hole, this facilitates connecting work between mounting portion 41 and supporting metal fitting 3.

Further, connecting metal fitting 4 is formed as a dogleg shape, and solely both ends in the longitudinal direction are in contact with and fastened with shield member 2 while the remaining portion of the connecting metal fitting 4 is separated from the exterior surface of the shield member 2. As a result, shield member 2 is resiliently supported by insulating envelope through connecting metal fitting 4. Accordingly, even if an impact force is applied to the shield member 2 at the time of switching on and off, this impact is properly relaxed by connecting metal fitting 4. If shield member 2 is deformed by heat, the determination can be suitably absorbed by connecting metal fitting 4. Accordingly, this makes it possible to protect that these impact or thermal deformation has bad effect on the supporting metal fitting 3 and glass insulating envelope 1 to injure insulating envelope 1, such as for example occurence of cracks. As a result, it is possible to obtain a vacuum power interrupter with high reliability and durability.

Connecting means between shield member 2 and connecting metal fitting 4, may be accomplished by brazing or welding (arc welding or resistance welding). Particularly, with resistance welding (spot welding), the connection can be easily carried out. Reference is made to connection between the shield member 2 and connecting metal fitting 4 by means of an arc welding. This method comprises the steps of disposing the both ends in the longitudinal direction of connecting metal fitting 4 at the tubular ends of the shield member 2, and welding by means of arc welding along outer the circumference of the metal shield member 2. With this method, since end edge of shield member 2 is cut round thereby enabling to relax electrostatic concentration at this portion. As a result, no additional work is required for cutting the edge round in order to prevent electrostatic concentration at the both ends of shield member 2.

[Ir] *It* is here noted that connecting metal fitting 4 is not only formed as a dogleg shape with the bending portion being provided at the middle portion thereof, but also formed as a dogleg shaped with the bending portion being provided at the portion except for the middle portion. Further, except for dogleg shaped connecting metal fitting with a specified bending portion, a curved connecting metal fitting without the provision of a bending portion may be used.

The basic requirement for the shape of this connecting metal fitting 4 is that its both ends in the longitudinal direction be fixed to the shield member 2 while the portions except for the both ends are separated from the shield member 2. That is, it is merely required that the connecting metal fitting 4 is connected to shield member 2 such that it has a resilient effect. The position for providing mounting portion 41 on the connecting metal fitting 4 is not limited to the bending position thereof. That is, it is sufficient to select the position providing for the mounting portion 41 so that resilient effect can be efficiently expected.

Since shield member 2 is held by supporting metal fitting 3 provided on the inner wall of insulating envelope 1, it is possible to make a vacuum vessel by solely insulating a container without requiring to join two insulating containers with each other as used in the prior art. Thereby, the conducting material does not project from the outside of the insulating vessel to guarantee long creeping distance with respect to the insulating of the conductor, resulting in making a small sized vacuum power interrupter.

In comparison to the prior art vacuum power interrupter fabricated by connecting two insulating containers, the vacuum power interrupter according to the present invention makes it possible to reduce the connecting portions. In proportion to the reduction of the connecting portions, the hermetical reliability can be improved and the assembling work for the vacuum power interrupter is facilitated. As a result, it is possible to reduce the welding steps and obtain a cheap and high durability vacuum power interrupter.

Figure 7:
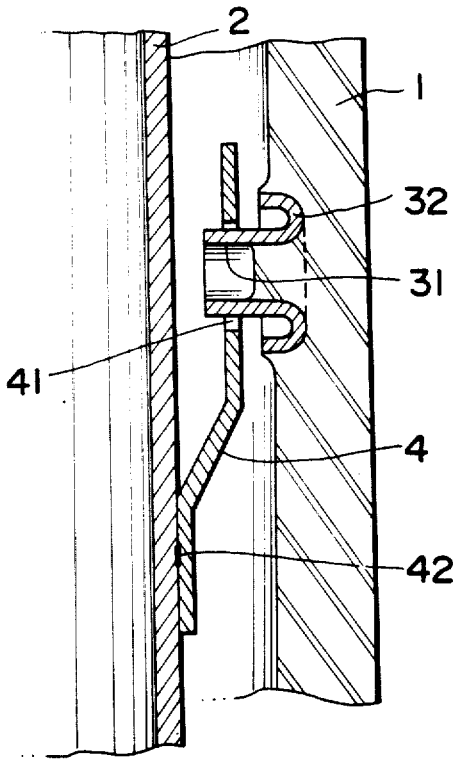
FIG. 7 is an elevational cross section showing another modification of an arc-shield supporting structure according to the present invention.

FIG. 7 shows a modification of connecting metal fitting 4. In this example, mounting portion 41 does not project from the outer surface of the plate, but is by itself formed as a hole for fitting the supporting means thereinto. Further, connecting metal fitting 4 is connected to arc-shield member 2 solely at the one end thereof. This connecting metal fitting whose shape in cross section is shown in FIG. 7 is obtained by applying plastic deformation to a flat plate when joining the arc-shield member to the insulating envelope.

Figure 8:
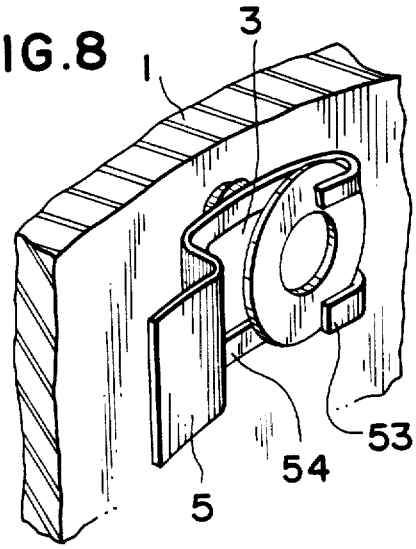
FIG. 8 is a perspective view illustrating a further modification of an arc-shield supporting structure to the present invention.

FIG. 8 shows another modified connecting metal fitting designated by reference numeral 5 in this example.

In order to ensure the connection between arc-shield member and supporting metal fitting, modified connecting metal fitting 5 is constituted so that its one lateral end is adapted to be fixed to arc-shield member 2, while the other lateral end is provided with forked portions 54 and turnover portions 53 each integrally formed with the portion 51. With this connecting metal fitting 5, it is possible to not only securely put the outer circumferencial surface of supporting metal 3 between forked portions 51, but also tightly embrace a flange formed at the projecting end of supporting metal 3 by turnover portions 53.

It is to be understood that modification and variations of the embodiments of the present invention disclosed herein may be resorted to without departing from the spirit of the invention and the scope of the appended claims.

What is claimed is:

1. In a vacuum power interrupter, comprising an insulating cylindrical envelope of glass, a pair of end plates fastened to the respective axial ends of said cylindrical envelope, stationary and movable contact rods provided through said end plates, respectively, so that they are aligned to each other in the axial direction of the insulating envelope, the stationary and movable contact rods each have electrical contacts attached thereto at the opposite ends thereof, and an arc-shield member disposed within the envelope to surround the electrical contacts, the improvement comprising:

(a) a plurality of hollow cylindrical supporting means each having substantially the same coefficient of thermal expansion of said insulating envelope, including a tubular supporting portion and a turnover outwardly U-shaped end portion, said end portion being embedded in an inner wall of said insulating cylindrical glass envelope so that the axis of said hollow cylindrical supporting means is directed in the radial direction of said envelope, and (b) a plurality of connecting metallic elongated plates, one end of which is fitted over [an exterior surface of] said [arc-shield member] *supporting means* while the other end of which is fixed to the exterior surface of said arc-shield member.

2. A vacuum power interrupter as defined in claim 1, wherein said connecting elongated plate is provided at one end thereof with a hole fitted over said supporting means and is fixed at the other end thereof to said arc-shield member.

3. A vacuum power interrupter as defined in claim 1, wherein said connecting elongated plate is provided with two lateral ends, one of said lateral ends being adapted to be fixed to said arc-shield member, while the other of said lateral ends is provided with forked portions and turnover portions each integrally formed with said forked portions, and said forked portions and turnover portions being fitted over said supporting means.

4. A vacuum power interrupter as defined in claim 1, wherein said connecting elongated plate is bent at the middle portion thereof so that it projects towards the inner wall of said insulating envelope, said plate having a mounting portion provided in the vicinity of the bent portin of the outside surface of the plate, said mounting portion being adapted to be fitted over said elongated plate, and each end of said plate is fixed to a respective one of the both ends of said shield member.

5. A vacuum power interrupter as defined in claim 1, 2, 3 or 4, wherein said connecting elongated plate is made of a material having the same coefficient of thermal expansion as that of said arc-shield member.

6. In vacuum power interrupter comprising an insulating cylindrical envelope of glass, a pair of end plates fastened to the respective axial ends of the cylindrical envelope, stationary and movable contact rods provided through the end plates, respectively, so that they are aligned to each other in the axial direction of the insulating envelope, the stationary and movable contact rods attaching electrical contacts at the opposite ends thereof, and an arc-shield member disposed within the envelope so as to surround the electrical contacts, the improvement comprising (a) hollow cylindrical supporting means which is integrally formed with a turnover end portion embedded in the inner wall of said insulating envelope so that its axis is directed in the radial direction of said insulating envelope, said supporting means being made of a material having the same coefficient of thermal expansion as that of said insulating envelope, and (b) connecting means one end of which is fitted over said supporting means while the other end of which is fixed to said arc-shield member, said connecting means comprising an elongated plate bent at the middle portion thereof so that it projects towards the inner wall of said insulating envelope, said plate having a mounting portion provided in the vicinity of the bent portion of the outside surface of the plate, said mounting portion adapted to be fitted over said connecting means, each end of said plate being fixed to the both ends of said shield member, respectively, and said elongated plate being provided at one end thereof with a hole fitted over said supporting means and is fixed at the other end thereof to said arc-shield member.

7. A vacuum power interrupter as defined in claim 6, wherein said connecting means is made of a material having the same coefficient of thermal expansion as that of the insulating envelope.

* * * * *